United States Patent [19]

Dattge et al.

[11] Patent Number: 5,413,766
[45] Date of Patent: May 9, 1995

[54] DEVICE FOR REDUCING EXHAUST GAS CONTAMINANTS, PARTICULARLY FOR MOTOR VEHICLES

[75] Inventors: Dieter Dattge, Rothenburg; Walter Stoepler, Herzogenaurach, both of Germany

[73] Assignee: Leistritz AG & Co. Abgastechnik, Fürht/Stadeln, Germany

[21] Appl. No.: 50,307

[22] PCT Filed: Oct. 5, 1992

[86] PCT No.: PCT/DE92/00842
§ 371 Date: May 11, 1993
§ 102(e) Date: May 11, 1993

[87] PCT Pub. No.: WO93/07366
PCT Pub. Date: Apr. 15, 1993

[30] Foreign Application Priority Data

Oct. 4, 1991 [DE] Germany .............. 91 12 336.4

[51] Int. Cl.[6] .................. F01N 3/28; B01D 53/36
[52] U.S. Cl. .................. 422/173; 422/174; 422/179; 422/177; 422/180; 422/198; 60/300; 60/299
[58] Field of Search ........... 422/174, 179, 177, 180, 422/173, 198; 60/299, 300; 55/DIG. 30; 423/212

[56] References Cited

U.S. PATENT DOCUMENTS

| | | | |
|---|---|---|---|
| 3,916,057 | 10/1975 | Hatch et al. | 428/236 |
| 4,200,609 | 4/1980 | Byrd | 422/177 |
| 4,344,921 | 8/1982 | Santiago et al. | 422/179 |
| 4,758,410 | 7/1988 | Grimm et al. | 422/179 |
| 4,863,700 | 9/1989 | Ten Eyck | 422/179 |
| 4,865,818 | 9/1989 | Merry et al. | 422/179 |
| 4,976,929 | 12/1990 | Cornelison et al. | 422/174 |
| 5,008,086 | 4/1991 | Merry | 422/179 |
| 5,028,397 | 7/1991 | Merry | 422/179 |
| 5,094,074 | 10/1992 | Nishizawa et al. | 422/174 |

FOREIGN PATENT DOCUMENTS

| | | |
|---|---|---|
| 0328293A1 | 8/1989 | European Pat. Off. . |
| 0398130A3 | 11/1990 | European Pat. Off. . |
| 3514150C | 4/1986 | Germany . |

*Primary Examiner*—Robert J. Warden
*Assistant Examiner*—Hien Tran
*Attorney, Agent, or Firm*—Spencer, Frank & Schneider

[57] ABSTRACT

A device for reducing contaminants, particularly for motor vehicles, includes a housing, a catalyst body disposed therein with its periphery spaced from the housing wall and an intumescent mat disposed in the gap between the housing wall and the catalyst body. The intumescent mat is a mat of a heat-resistant fiber mat with embedded expansion particles whose volume increases when a certain expansion temperature is reached that is produced by the hot exhaust gases. By providing an additional heating element in the gap between the housing and the catalyst body, the intumescent mat can be heated to the expansion temperature.

17 Claims, 1 Drawing Sheet

DEVICE FOR REDUCING EXHAUST GAS CONTAMINANTS, PARTICULARLY FOR MOTOR VEHICLES

BACKGROUND OF THE INVENTION

1. Field of the Invention

The invention relates to a device for reducing exhaust gas contaminants, particularly for motor vehicles, which includes a catalyst body disposed within a housing such that the periphery of the catalyst body is spaced from the housing, and an intumescent mat disposed within a gap formed between the housing and the catalyst body.

2. Description of the Related Art

Such devices, hereinafter simply called "catalytic converters", are essentially composed of a usually dual-shell housing of a metallic material in which one or also several catalyst bodies are mounted. The catalyst body is penetrated by channels that extend parallel to the direction of flow of the exhaust gases and are coated with a catalytically active material. In the mentioned catalytic converters, the catalyst body is frequently composed of a ceramic material. Such ceramic bodies, the so-called monoliths, are naturally very sensitive to breaking and, compared to metallic materials, have a negligible coefficient of thermal expansion.

The monoliths are mounted in the catalytic converter housing by means of conventional supporting mats, usually called intumescent mats. These intumescent mats are mounted with excess dimensions compared to the free width of the gap between the monolith and the housing wall, thus resulting in a pressure force that is generated by the elastic restoring forces of the mineral fiber binder system on the housing wall and the peripheral surface of the monolith. The expansion particles embedded in the intumescent mat, for example in the form of hydrated mica platelets, now have the characteristic that their volume increases by a multiple beginning at a temperature of about 400° C. The reason for this increase in volume is that the water bound in the intermediate layers of the hydrated mica is irreversibly split off, changes to the vapor state and expands the stacked mica layers somewhat in the manner of an accordion. The water vapor is then caught in the pockets formed by the spread-apart mica layers. Although the volume of the bloated mica platelets is reduced to a certain degree when the system cools to room temperature due to the reduction in pressure and a partial escape of the water vapor that is trapped in the pockets, the surface pressure exerted by the intumescent mat on the housing wall and the monolith is increased considerably compared to the state before the first use of the catalytic converter. When the intumescent mat is again heated to operating temperature, the expanded mica platelets, due to the expansion of the gas or water vapor enclosed in the pockets, act like gas springs.

Due to the described characteristics of the expansion particles, the increase resulting from the different coefficients of thermal expansion of the housing material and the monolith in the size of the gap disposed between the housing and the monolith is compensated. In the case of intumescent mats to which a binder has been added in order to increase their initial elasticity, the thermally caused reduction of the elastic restoring force of the intumescent mat as a result of the heat is additionally compensated. At the existing operating temperatures, cracking and oxidative processes decompose or reduce the binder, which is generally composed of a rubber-elastic synthetic or natural material, in the intumescent mat with at least a partial loss of its mass and its elastic recovery property.

The drawback of the known intumescent mats is now that the desired expanded state occurs only if the vehicle is driven at least once in a load range in which the heat supplied to the intumescent mat by the exhaust gases is sufficient to increase the temperature to at least 400° C. If such an operating state is not attained over a longer period of time, the carrier body may, under unfavorable circumstances, for example with poor road conditions or jerky driving, may come loose from its attachment and may be at least partially destroyed when it hits metal components of the catalytic converter housing. This effect may occur, for example, in vehicles having large displacement engines and, in particular, if in addition, due to local traffic rules, relatively low speed limits are prescribed or if vehicles equipped with small or medium size engines are driven by persons in a restrained manner.

SUMMARY OF THE INVENTION

It is the object of the present invention to provide catalytic converters which do not have this drawback. This is accomplished by a device for reducing exhaust gas contaminants having a catalyst body disposed within a housing such that the periphery of the catalyst body is spaced from the housing, an intumescent mat disposed within a gap formed between the housing and the catalyst body, the intumescent mat having heat resistant fibers and expansion particles, particularly of hydrated mica or graphite salts, which are converted at an expansion temperature into a practically irreversible expanded state, wherein an added heating device is disposed at the gap to heat the intumescent mat to the expansion temperature.

Accordingly, an additional heating means is provided in the gap between the catalytic converter housing and the catalyst body to bring the intumescent mat to the expansion temperature for the expansion particles independently of the operating state of the vehicle engine and independently of the operating temperature in the catalytic converter housing.

An advantageous embodiment of the invention, which includes an exothermal reaction substance whose reaction is initiated at an initiation temperature below the expansion temperature, can be realized practically without any additional structural expenditures. Accordingly, an exothermally reacting mixture of substances is disposed in the gap between the catalytic converter housing and the catalyst body, with a reaction of this mixture of substances being initiatable at an initiation temperature that lies below the expansion temperature so that the expansion of the expansion particles can be effected already under weak load conditions in the vehicle.

The invention includes various advantageous embodiments of the catalytic converter according to the invention. The sheet coated with a reaction mixture can be inserted in a simple manner during assembly of the catalytic converter either between the monolith and the intumescent mat and/or between the intumescent mat and the housing or it can already be connected with the intumescent mat, for example by gluing, before the latter is installed. The invention makes it possible to dispense with at least part of the reduction agent since carrier sheet, adhesive and binder themselves act as reduction agents.

BRIEF DESCRIPTION OF THE DRAWINGS

The invention will be described in greater detail with reference to embodiments thereof and with the aid of the attached drawings, in which.

DETAILED DESCRIPTION OF THE PREFERRED EMBODIMENTS

Figure 1:
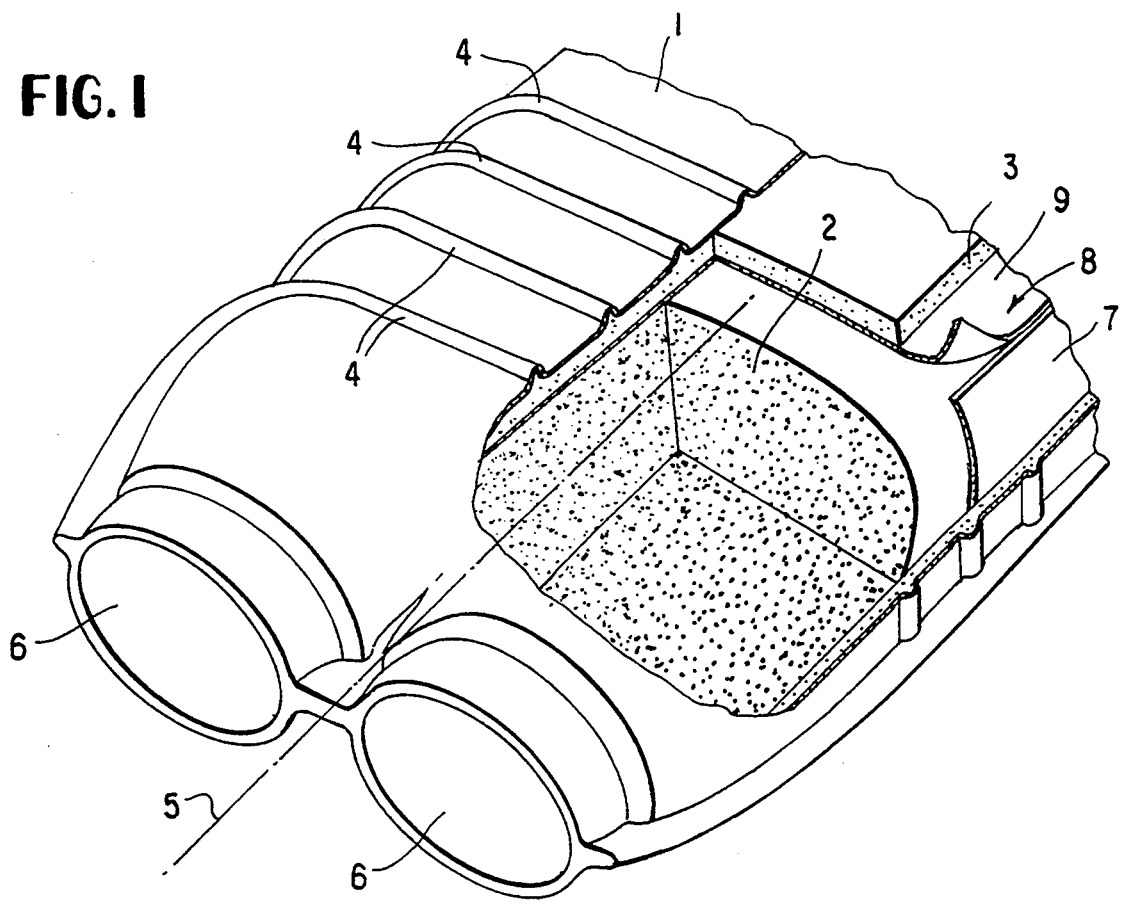
FIG. 1 is a perspective view of a partially opened catalytic converter according to the invention.
Figure 2:
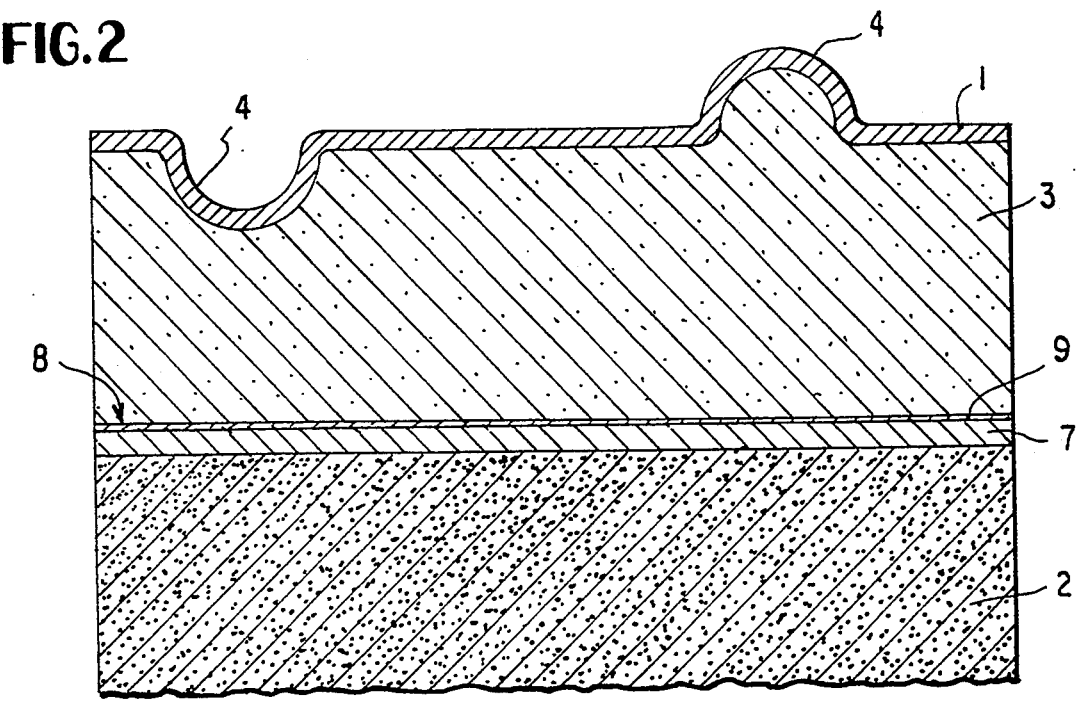
FIG. 2 is a schematic sectional view showing the arrangement of catalyst body, additional heating means and supporting mat in the catalytic converter housing.

As can be seen in FIG. 1, the catalytic converter according to the invention is composed of a housing 1 assembled of two half shells and a catalyst body 2 disposed therein. An intumescent mat or supporting mat 3 which completely surrounds the periphery of the catalyst body is arranged between the housing wall and catalyst body 2. In order to increase its bending and torsion resistance, housing 1 is provided with outwardly and inwardly (FIG. 2) projecting beads (4). Particularly the inwardly projecting beads increase the secure positioning of intumescent mat 3 and catalyst body 2 in the direction of the longitudinal axis 5 of housing 1. At its side facing the vehicle engine, housing 1 is provided with two intake openings 6 to which a dual intake pipe can be connected.

A carrier sheet 7 is disposed between carrier or carrier body 2 and intumescent mat 3 to completely surround its periphery. On the side 8 of carrier sheet 7 where it faces the supporting mat, a reaction layer 9 is applied by means of an adhesive to form the additional heating means.

The side 8 of carrier sheet 7 facing intumescent mat 3 is coated with an acrylic latex adhesive. The pulverized reaction mixture composed of $KMnO_4$ and cellulose adheres to this adhesive layer. The reaction mixture is applied at 400 g per square meter of the sheet. The $KMnO_4$ and cellulose reaction components are present in a mass ratio of 5.85:1. Carrier sheet 7 itself is composed of paper.

The intumescent mats are commercially available products that are frequently used for the purpose of the invention. In the mentioned example, an intumescent mat is employed in which vermiculite is embedded and which has an area weight of 4,070 $g/m^2$ and contains a binder (acrylic latex) in an amount of 6% to 8%. Vermiculite is an expandable intumescent or hydrated mica that is created from biotite by the exposure to weather. However, graphite salts may also be employed as expandable substances. Such compounds, which are also known under the name "expanded graphites", salts that decompose thermally while splitting off gases are embedded in the intermediate layers of the graphite layer lattice.

The intumescent mat, which is possibly already supplied as a piece that is cut to precise dimensions, is glued to carrier sheet 7 on one or, if desired, both sides in such a way that reaction layer 9 faces intumescent mat 3. No additional adhesive needs to be applied to reaction layer 9 for this adhesive attachment. The residual adhesion still existing on the surface of reaction layer 9 is generally sufficient to produce adhesion to the intumescent mat.

After the assembly of a catalytic converter according to the invention, the reaction mixture can be activated either, before installation in a vehicle exhaust system, by the addition of external heat or, after it has been installed, when the vehicle is operated for the first time. A temperature of about 260° C. is required to ignite the reaction mixture. This temperature is realized already when the vehicle is operated under a weak load. The reaction then taking place is such that the $KMnO_4$ is reduced to brownstone and the cellulose of the coating, and in part also of the paper carrier sheet, is oxidized within a few seconds to carbon dioxide and water. The acrylic latex present on the carrier sheet or carrier foil and in the intumescent mat may also take part in this reaction as a reduction agent.

By varying the quantity of the reaction mixture applied per square meter of carrier sheet, the quantity of heat supplied to intumescent mat 3 can be monitored. For example, it is not necessary that all of the mica platelets present in the supporting mat are activated already when the expansion temperature is reached for the first time. As could be demonstrated by several series of experiments, depending on the type of intumescent mat employed, about 30% to 40% of activated mica platelets are already enough to sufficiently fix the catalyst body in place. The remaining not yet activated mica platelets can serve as a safety reserve for later high load cycles since it is then possible to further activate the intumescent mat.

Another embodiment of the invention resides in that the reaction mixture is applied directly to one or both sides of the intumescent mat, for example by means of an acrylic latex adhesive. Finally, it is also possible to introduce a reaction mixture into the intumescent mat itself, for example in liquid form, or to apply a reaction mixture in directly when the mat is manufactured.

In closing, it should be noted that any desired exothermal reaction systems may be employed as the additional heating means. For example, it is conceivable to employ exothermally decomposing substances or mixtures, such as peroxo acids, peroxides, nitro compounds, substituted tetrazoles, etc. Further, a mixture may be employed which is composed of reaction components which react with one another in an exothermal polymerization reaction. Finally, it is also conceivable to provide an additional heating means in the manner of an electric blanket by way of an electric resistance heating element 10 that surrounds the supporting mat, which could then be activated perhaps only when the vehicle engine is ignited for the first time.

We claim:

1. A device for reducing exhaust gas contaminants comprising:

a housing;

a catalyst body disposed in the housing with a periphery of the catalyst body being spaced from the housing to form a gap between the catalyst body and the housing;

a supporting mat disposed in the gap between the catalyst body and the housing, the supporting mat including heat-resistant fibers and expansion particles, the expansion particles being one selected from the group consisting of hydrated mica and graphite salt, and being converted at an expansion temperature produced by exhaust gases into a substantially irreversible expanded state; and a heating means disposed in the gap between the catalyst body and the housing for heating the supporting mat to the expansion temperature, the heating means being composed of one selected from the group consisting of an exothermal reacting substance and a mixture including an exothermal reacting substance, the exothermal reacting substance and the mixture including the exothermal reacting substance each having a exothermal reaction which is initiated at an initiation temperature which is less than the expansion temperature.

2. A device according to claim 1, wherein the heating means is disposed between the supporting mat and the housing.

3. A device according to claim 1, wherein the heating means is disposed between the supporting mat and the catalyst body.

4. A device according to claim 1, wherein the heating means is disposed between the supporting mat and the housing and between the supporting mat and the catalyst body.

5. A device according to claim 1, wherein the heating means is disposed at least partially within the supporting mat.

6. A device according to claim 1, wherein the said heating means is applied to one or both sides of a carrier sheet, the carrier sheet being disposed between at least one of the supporting mat and the housing, and the supporting mat and the catalyst body.

7. A device according to claim 6, wherein the carrier sheet is provided with an adhesive layer on one or both sides for fixing said heating means to the catalyst supporting carrier sheet.

8. A device according to claim 1, wherein the mixture is composed of at least one oxidation agent and at least one reduction agent.

9. A device according to claim 8, wherein the oxidation agent is $KMnO_4$ and the reduction agent is cellulose.

10. A device according to claim 6, wherein the carrier sheet is composed of a material that is a reduction agent.

11. A device according to claim 10, wherein the carrier sheet is composed of paper.

12. A device according to claim 7, wherein at least one of the adhesive layer of the carrier sheet and a binder contained in the supporting mat is a reduction agent.

13. A device according to claim 12, wherein the adhesive layer and the binder are composed essentially of acrylic latex.

14. A device according to claim 1, wherein the mixture is composed of reaction components which react with one another in an exothermal polymerization reaction.

15. A device according to claim 1, wherein the mixture is formed of substances which exothermally decompose.

16. A device according to claim 1, wherein at least one reaction component of the mixture is disposed in the supporting mat.

17. A device according to claim 1, wherein the supporting mat includes mineral fibers.

* * * * *

UNITED STATES PATENT AND TRADEMARK OFFICE
CERTIFICATE OF CORRECTION

PATENT NO. : 5,413,766
DATED : May 9, 1995
INVENTOR(S) : Dieter Kattge et al

It is certified that error appears in the above-indentified patent and that said Letters Patent is hereby corrected as shown below:

On the title page, under item [19], "Dattge," should be --Kattge--.

On the title page, item [75], the first inventor's name should read --Dieter Kattge--.

On the title page, item [73], line 2 should read --Fürth/Stadeln, Germany--.

Signed and Sealed this

Twenty-fifth Day of July, 1995

Attest:

BRUCE LEHMAN

*Attesting Officer*  *Commissioner of Patents and Trademarks*